(12) United States Patent
Muramatsu et al.

(10) Patent No.: US 6,832,235 B1
(45) Date of Patent: *Dec. 14, 2004

(54) MULTIPLE BLOCK ADDER USING CARRY INCREMENT ADDER

(75) Inventors: Shigetoshi Muramatsu, Ibaraki (JP); Tsuyoshi Tanaka, Ibaraki (JP); Akihiro Takegama, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 646 days.

This patent is subject to a terminal disclaimer.

(21) Appl. No.: 09/955,138

(22) Filed: Sep. 19, 2001

Related U.S. Application Data

(60) Provisional application No. 60/269,450, filed on Feb. 16, 2001.

(51) Int. Cl.[7] .................................................. G06F 7/50
(52) U.S. Cl. ........................................ 708/710; 708/714
(58) Field of Search ................................. 708/710, 711, 708/712, 713, 714

(56) References Cited

U.S. PATENT DOCUMENTS

| 4,761,760 | A | * | 8/1988 | Tomoji | 708/714 |
| 5,517,440 | A | * | 5/1996 | Widigen et al. | 708/708 |
| 5,548,546 | A | * | 8/1996 | Jang et al. | 708/706 |
| 5,898,596 | A | * | 4/1999 | Ruetz | 703/21 |
| 5,912,833 | A | * | 6/1999 | Jang et al. | 708/707 |

* cited by examiner

*Primary Examiner*—Chuong Dinh Ngo
(74) *Attorney, Agent, or Firm*—Robert D. Marshall, Jr.; W. James Brady, III; Frederick J. Telecky, Jr.

(57) ABSTRACT

A multiple block adder is provided wherein carry select adder (CSA) is used in the most significant bit (MSB) block, a carry increment adder (CIA) is used in the least significant bit block and a combination of carry increment adder (CIA) and carry lookahead adder (CLA) circuit is used in the middle block.

8 Claims, 4 Drawing Sheets

MULTIPLE BLOCK ADDER USING CARRY INCREMENT ADDER

This application claims priority under 35 USC §119(e)(1) of Provisional Application No. 60/269,450, filed Dec. 22, 2000. The present application claims priority from U.S. Provisional Application Ser. No. 60/269,450 filed Feb. 16, 2001 entitled "A Low Power and High Performance Multiply Accumulate (MAC) Module" of Kaoru Awaka et al. This disclosure is incorporated herein by reference.

FIELD OF INVENTION

This invention relates to an improved adder architecture in which both a carry increment adder is used with a carry lookahead adder.

BACKGROUND OF INVENTION

A conventional N-bit comprises adder building blocks. A common adder building block is a full adder that takes as input, bit A, bit B and carry-in bit Cin and produces sum S and carry-out Cout as illustrated in FIG. 1. A cascade of N full adders can be used to provide an N-bit ripple carry adder as illustrated in FIG. 2. FIG. 2 illustrates three adders adding three bits at input A (bits 0–2) to three bits at input B (bits 0–2) to get sum bits S0–S2) and carry (Cout). A ripple carry adder is one that the output sum gets updated from lower bits. The higher bit waits for the carry propagation from the lower bit adder. A ripple carry adder is too slow for most long adders since an n bit ripple carry takes N full delays.

The delay can be reduced by carry lookahead adder (CLA) that computes the carry through several bits using one complicated gate instead of a cascade of several full adders. An example of a 16-bit lookahead adder is illustrated in FIG. 3. It has four 4-bit blocks 11–14 and the lookahead circuits 15–17 to quickly send the carry to the most significant bits at the ripple carry adder block 11 for summing bits 12–15. Each of the blocks 11–14 includes four ripple carry full adders to sum four bits as illustrated with three bits in FIG. 2.

A high speed adder can be provided using carry select adders (CSA). A 16-bit carry select adder (CSA) adder system comprises three 4-bit CSA adder blocks 22–24 and a 4-bit ripple carry adder block 21 is illustrated in FIG. 4. The ripple carry block adder 21 adds the four least significant bits [3:0]. The most significant bit CSA adder block 24 adds the most significant bits [15:12], the next lower level bit CSA adder block 23 adds bits 8–11 ([11:8]) and the lowest CSA adder block 22 adds bits 4–7 ([7:4]). The block separation might be 4-4-4-4 as shown but may also be 5-4-4-3 or other. This depends on circuit optimization, input signal delays, etc. Each of the CSA adder blocks 22–24 comprises two ripple carry adders 25 and 26 to pre-compute carry- in "0" and "1" case. When carry-in is reached, the sum S output is "0" case or "1" case. The two short adders 25 and 26 at each block of four bits speculatively calculate the sum assuming the carry-in of a "0" or "1", and the actual carry in to the trigger a multi-plexor (MUX) 27 selects the appropriate sum.

The CSA is one of the fastest adder architectures that realize high performance MAC unit, but it cannot generate carry signal as fast as CLA can. Since one of the most critical paths of the adder block is related to the generation of carry signal to the most significant bit (MSB), CLA circuit is used to generate carry signals sent to MSB.

A higher speed adder is a carry select adder (CSA) with carrier lookahead adder (CLA) circuits is illustrated in FIG. 5. The example in FIG. 5 is a 16-bit adder with a carry lookahead adder (CLA) circuit 28 between each 4-bit CSA adder 29 and between the ripple adder 29a and the CSA 29b with the CLA circuit used to generate carry signals to the MSB.

It is highly desirable to make this path faster without degradation of generation speed of the sum and thereby increase adder speed.

SUMMARY OF INVENTION

In accordance with one embodiment of the present invention an adder architecture is provided in which both carry lookahead and carry increment adders are used.

In accordance with another embodiment of the present invention a long adder is provided by the combination of carry select adder and carry increment adders.

DESCRIPTION OF PREFERRED EMBODIMENT OF THE PRESENT INVENTION

Figure 1:
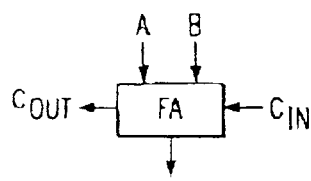
FIG. 1 illustrates a full adder according to the prior art.
Figure 2:
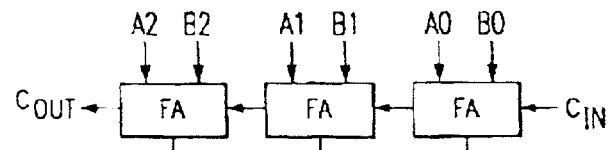
FIG. 2 illustrates a ripple carry adder according to the prior art.
Figure 3:
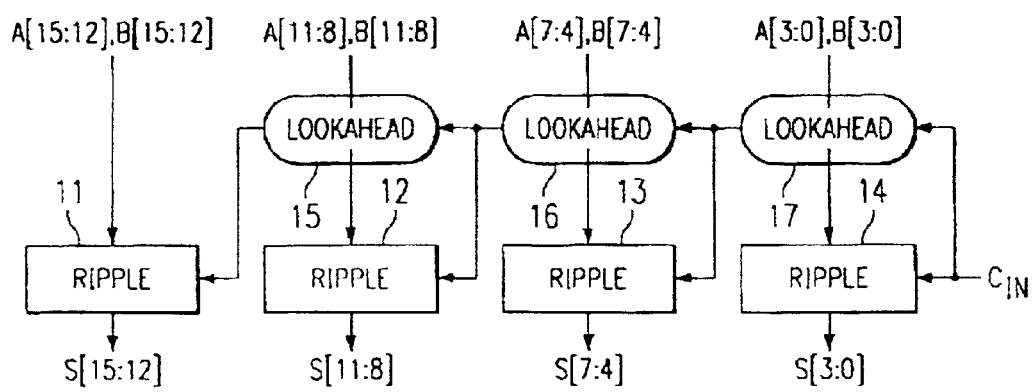
FIG. 3 illustrates a carry lookahead adder (CLA) according to the prior art.
Figure 5:
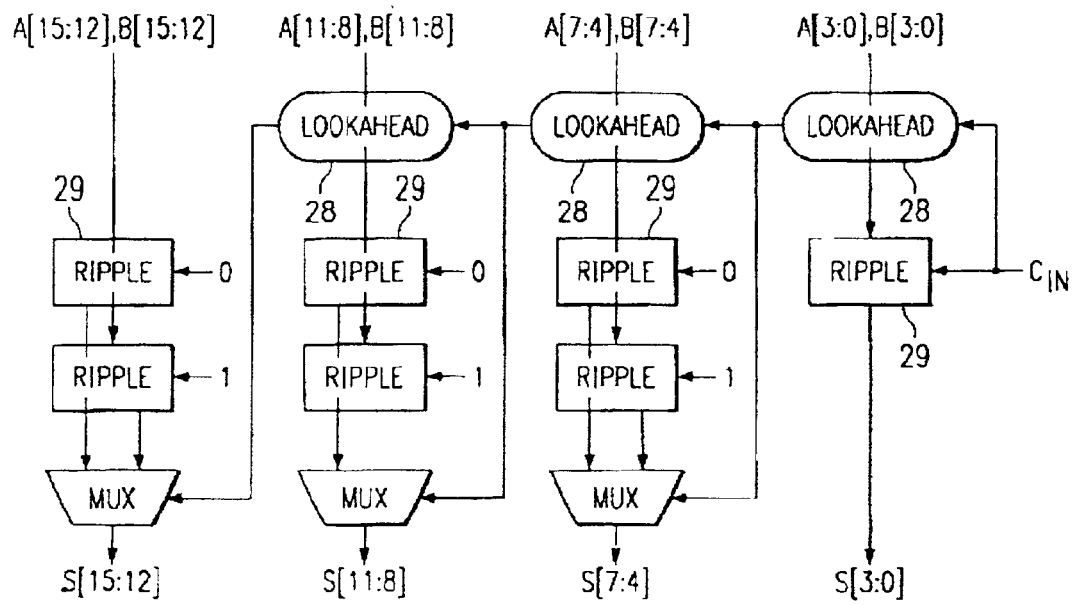
FIG. 5 illustrates a higher speed 16-bit adder with CLA and CSA adders according to the prior art.
Figure 4:
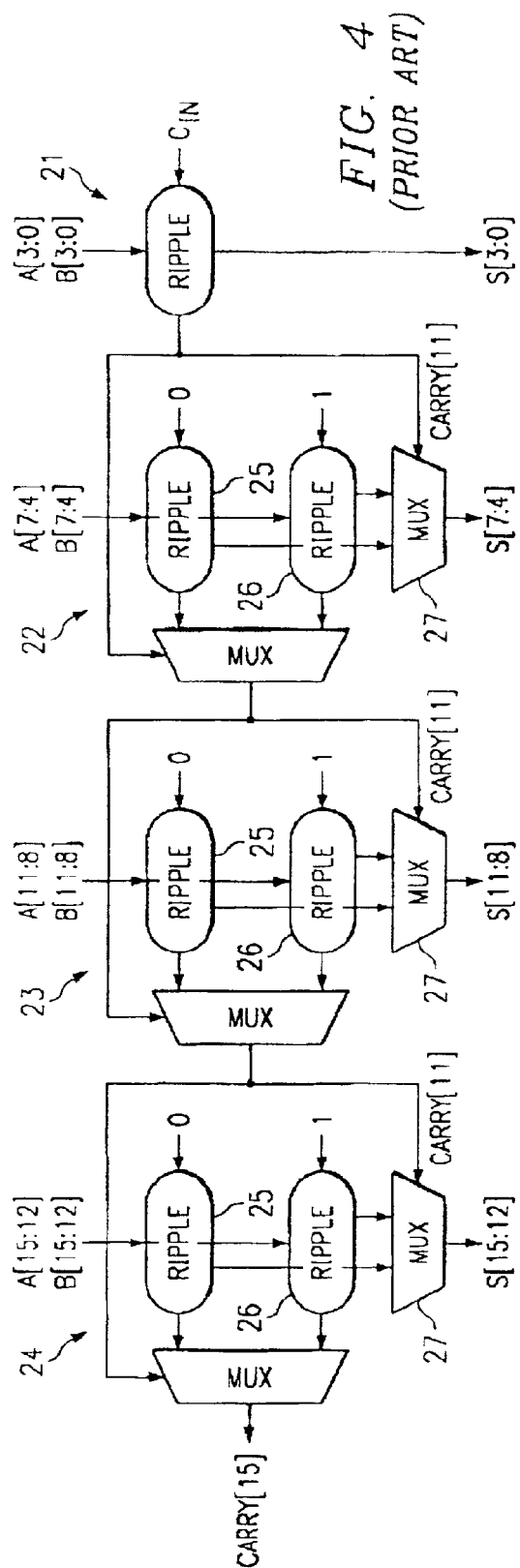
FIG. 4 illustrates a 16-bit adder with CSA adders according to prior art.

A first preferred embodiment of the present invention is described in connection with a configuration illustrated in FIG. 6 that is used in a special high speed long adder used in a multiply accumulate module (MAC). This special adder is described in FIG. 7 of the above cited application Ser. No. 60/269,450 filed Dec. 22, 2000 entitled "A Low Power and High Performance Multiply Accumulate (MAC) Module" of Kaoru Awaka et al. In this particular application the multiply output is adder input. Then the adder input signal will reach adder in different time. The time difference enables the use of low power multiply cell as described in Application serial no. of TI-33253, incorporated herein by reference. The configuration is a 41 bit +41 bit adder [bits 40:0] for example. A higher speed adder for this application includes carry select adders (CSA) and carry lookahead adders (CLA) as illustrated for example in FIG. 6. The high speed, long adder system 30 of FIG. 6 comprises a first CSA [14:0] adder 31 for summing the fifteen least significant bits [14:0], a next higher level middle CSA [30:15] adder 32 combined with a carry lookahead adder (CLA) 35, and a highest level CSA[40:31] adder 33. The CSA[14:0] adder 31 comprises sub-blocks adders and is similar to the combined blocks illustrated in FIG. 4 with a ripple carry sub-block for the four least significant bits or CSA[3:0], a middle CSA sub-block block for the next six higher bits or CSA[9:4], and a highest CSA adder sub-block for the highest five bits or [14:10]. This CSA[14:0] block can be represented as comprising: ripple[3:0]→CSA[9:4]→CSA[14:10]. The sub-block separations may vary and are dependent on circuit optimization, input signal delay, etc. The CSA [30:15] block adder 32 receives the carry (carry14) from the CSA [14:0] and has three sub-blocks, for example, with a block separation of CSA[18:15]→CSA[24:19]→CSA[30:25]. While one carry lookahead adder CLA block 35 is illustrated there may be multiple lookahead circuits such as one for every block separation. The CSA [40:31] is a single CSA 10-bit adder block that receives the carry30 from carry lookahead adder CLA 35. Each of the CSA adders comprises two ripple carry adders to pre-compute carry-in "0" case and "1" case and the multiplexor. When carry-in is reached, "S" output is selected "0" case or "1" case.

Figure 7:
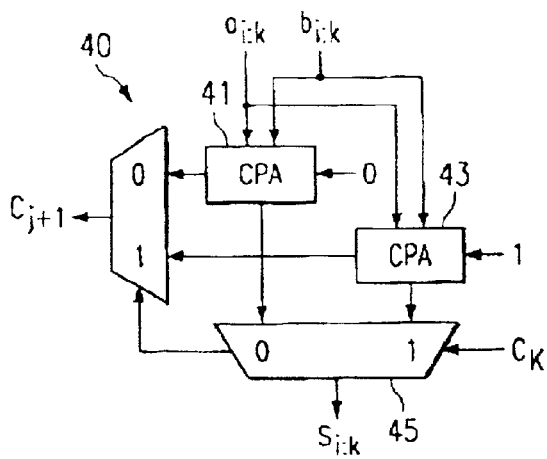
FIG. 7 illustrates a carry select adder (CSA).

Referring to FIG. 7 there is illustrated the detail of a carry select adder. The carry select adder (CSA) 40 has two ripple carry or carry-propagate adders (CPAs) 41 and 43, which speculatively calculate the sum assuming the carry-in equals 0 or 1, and actual carry-in $C_k$, can trigger a MUX 45, which selects the appropriate sum. These two CPAs 41 and 43 increase load capacitance on signal lines. There are two ripple carry adders for each CSA.

Figure 8:
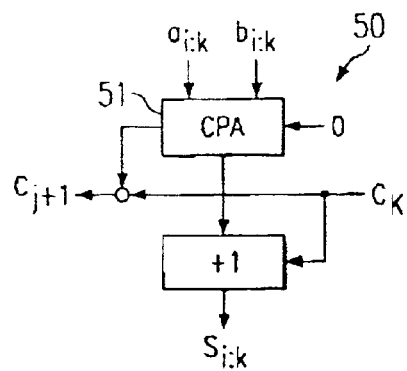
FIG. 8 illustrates a carry increment adder (CIA).

Referring to FIG. 8 there is illustrated a carry increment adder (CIA) 510. The CIA 50 has only one ripple carry or carry propagate adder CPA 51. In CIA 50 only the result with carry-in 0 is pre-computed and incremented by 1 afterwards if $C_k$ equals 1. Therefore, comparing to carry select adder (CSA), CIA 50 can make carry signals faster because of drastic reduction in load capacitance CIA is better than CSA with these points: 1. Fewer number of ripple carry adder (same meaning of CPA-Carry Propagate adder). 2. Fewer transistors. 3. Less load capacitance. 4. Possible to make faster carry generation.

Figure 6:
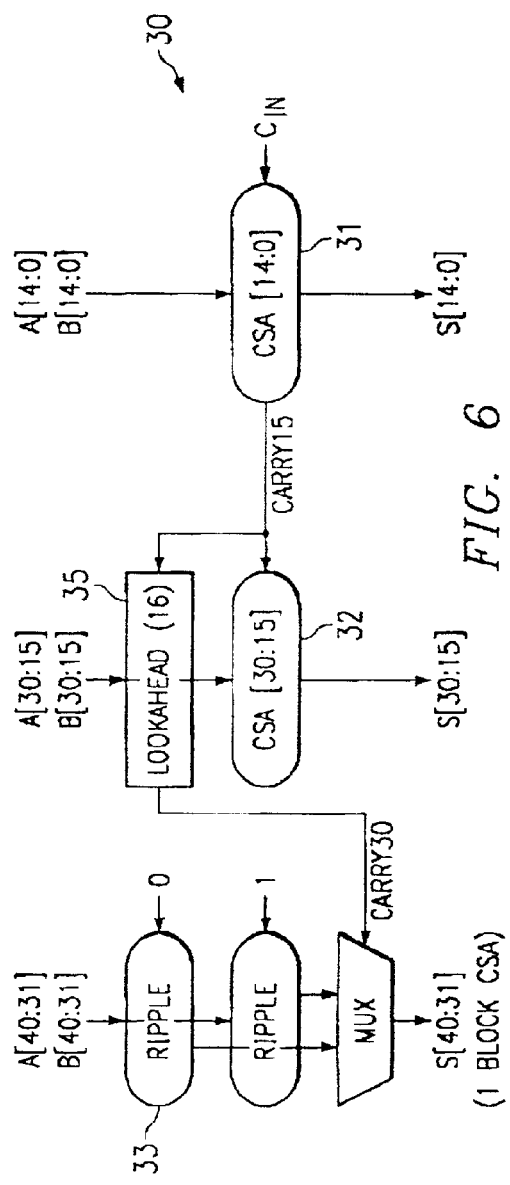
FIG. 6 illustrates a long adder adder with CLA and CSA adders.
Figure 9:
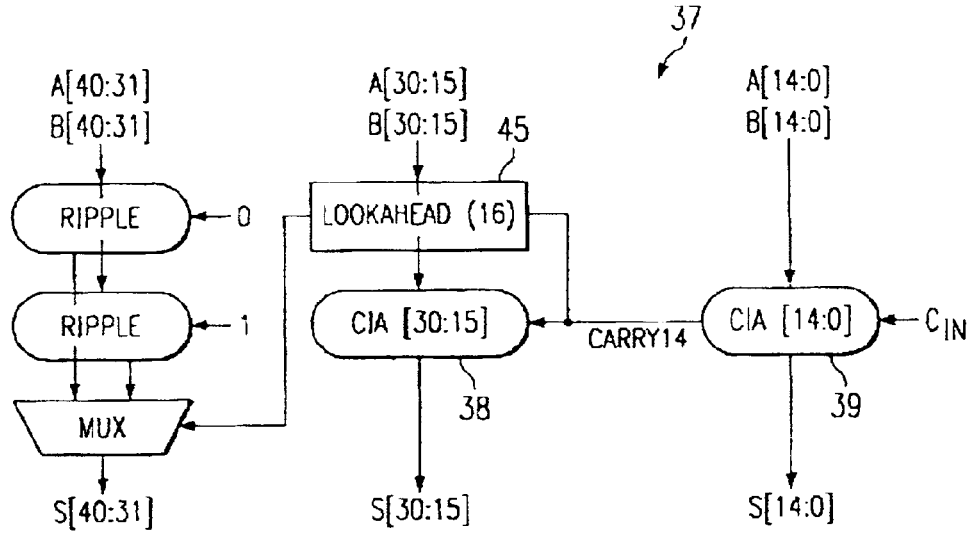
FIG. 9 illustrates an adder configuration according to one embodiment of the present invention using carry select adder CLA, carry increment adder CIA and carry lookahead adder CLA.

The new adder architecture according to the present invention for the configuration like that illustrated in FIG. 6 is illustrated in FIG. 9. CSA [30:15] adder 32 and CSA [14:0] adder 31 are replaced with a carry increment adders CIA [30:15] adder 38 and CIA [14:0] adder 39. The CIA [14:0] and CIA[30:15] may have the same sub-block separation as discussed in connection with FIG. 6 or different separation. For the same separation it would be for CIA [14:0] the following: ripple [3:0]→CIA [9:4]→CIA [14:0]. For CIA [30:15] the following sub-blocks CIA [18:15] →CIA[24-19]→CIA[30:25] may be used. CIA is used in place of CSA for the middle blocks as an improvement to the adder of FIG. 6. CSA is used for the block 39 that includes the MSB bit or signed bits. This is used to define overflow or underflow. In CSA case, we can pre-calculate overflow/ underflow in both propagate carry "0" case and "1" case, and can select with carry. But CIA case, difficult to precalculate overflow/underflow due to "S" out will not be defined before propagate carry arrive. So we need to keep the MSB bits to remain CSA [40:31]. By using the CSA at the most significant bit block 39, overflow signals can be generated faster. As discussed previously, the circuit performance of the adder is determined by the carry signals from the middle block. In the middle block 38 the CIA is used where CSA was used in the prior art of FIG. 6 with carry look-ahead (CLA) adders 45 to make the carry signals faster. This change from CSA to CIA reduces load capacitance and results in both power and delay reduction.

CSA can make faster sum signals, $S_{i:k}$, as compared with CIA because there is no need to take sum when $C_k$ is 1. Since fast sum signals are required to generate overflow detect signal, the most significant bits (MSB) block to use CSAs.

The present invention makes the carry signals faster without degrading the delay for other signals. The improvement in circuit performance obtained by the present invention is summarized by the multiply-accumulate (MAC) module level delay and power. Conventional prior art structure delay is 3.995 nanoseconds and uses 0.2174 milli-watts. The new structure delay is 3.687 nanoseconds and uses 0.1604 milliwatts. This amounts to a difference of 308 picoseconds and 0.057 milliwatts. The condition for the speed simulation is 1.35V, 125C, weak corner. For power simulation, nominal transistors were used. Power was measured at 100 MHz. In addition to speed improvement of 8%, power was also reduced 26%, due to drastic reduction of load capacitance.

Since CIA requires less numbers of carry propagate adder (CPA) n numbers of transistors can be reduced. Thus, load capacitance becomes smaller and it results in lower power and high performance.

Figure 10:
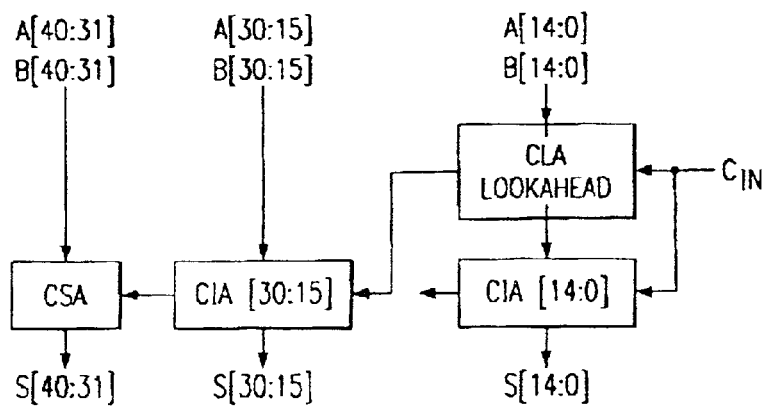
FIG. 10 illustrates an adder with a CSA for the MSB and CIA adder for other significant bits and CLA carry for bits [14:0].
Figure 11:
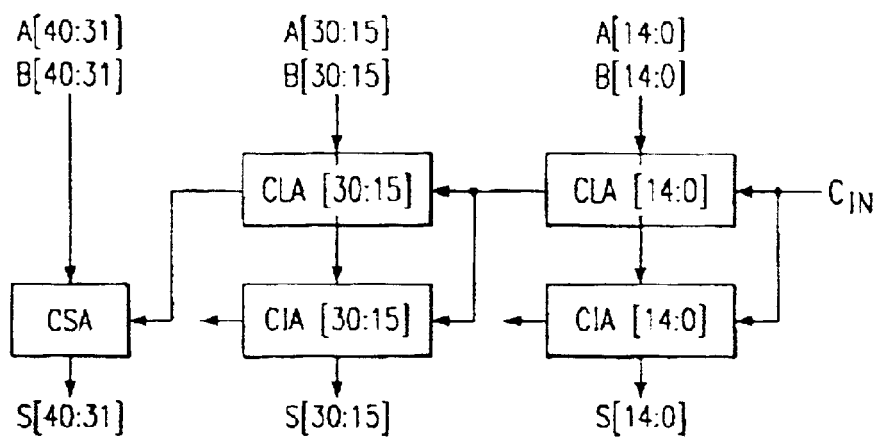
FIG. 11 illustrates an adder with a CSA adder for the MSB and CIA adder for other less significant bits and a CLA carry for both bits [14:0] and [30:15].
Figure 12:
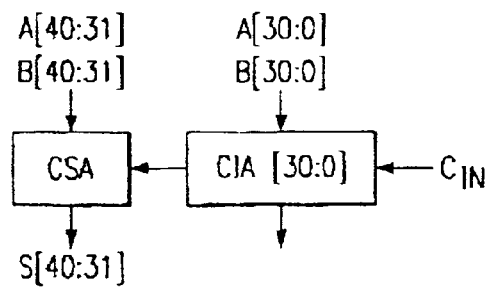
FIG. 12 illustrates the 41 bit adder with the combination of CSA adder and CIA adders without a carry lookahead adder.

As stated previously the configuration of FIG. 9 (which is a modification of FIG. 6) is only by way of example. Other configurations for the same number of bits may be like that illustrated in FIGS. 10-12 for example. FIG. 10 illustrates a case where the input will be reached at the same time and the carry lookahead circuit is for the bits [14:0]. In the FIG. 11 example there is a carry lookahead circuit for bits [14:0] and for bits [30:15]. In the configuration of FIG. 12 there is no carry lookahead circuit. It is the combination of the CIA for bits [30:0] and CSA for bits 40:31.

Figure 13:
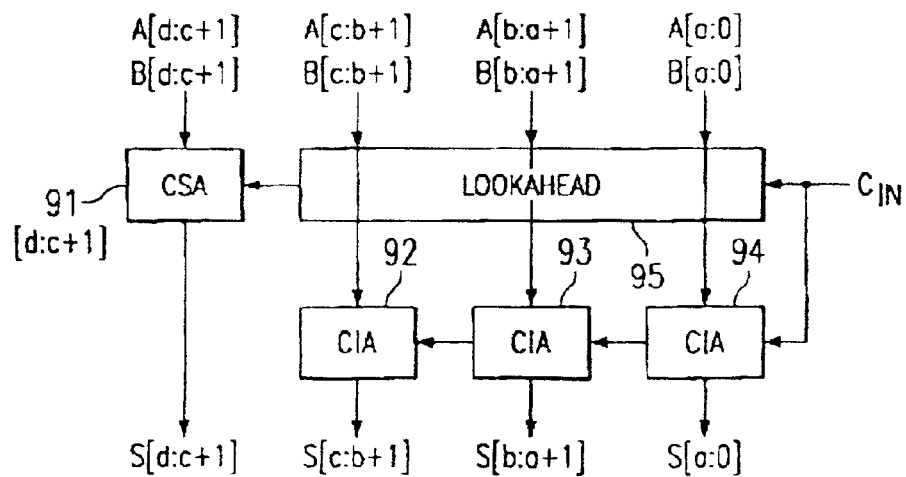
FIG. 13 illustrates a more general high-speed adder using carry select adder CLA, carry increment adder CIA and carry lookahead adder CLA.

FIG. 13 illustrates a more general high-speed adder using CIA, CLA and CSA adders. It is assumed d>c>b>a>0. It is assigned that [d: c+1] will be signed bits, then as discussed above, to detect overflow/underflow faster, CSA [d: c+1] (represented by adder 91) will be good choice. This is used for the MSB block 91. In the middle blocks [c: b+1] or block 92, [b: a+1] or block 9.3 and [a:0] or block 94 are carry increment adders (CIA) and these are used with the carry lookahead CLA circuits 95. There can be multiple carry lookahead circuit for each CIA block. Also CIA can make hierarchical approach for speed-up.

The number of bits and the block separations depends on the circuit optimizations, input signal delays, etc. Various modifications of the embodiments of the present invention will be apparent to those skilled in the relevant art and various modification, additions, substitutions and the like can be made without departing from the spirit of the invention and there are therefore considered to be within the scope of the invention as defined in the following claims.

What is claimed is:

1. An adder comprising:
   a carry select adder and
   a carry increment adder.
2. The adder of claim 1 wherein said carry select adder is used for the most significant bits.

3. The adder of claim 1 wherein said adder comprises multiple blocks and wherein said carry select adder is used in a block for the most significant bits; said carry increment adder is used in the block for the least significant bits and a mixed carry increment adder and carry lookahead adder circuit are used in a middle bit block.

4. The adder of claim 1 including multiple carry increment adders with at least one of said carry increment adders used with a carry lookahead adder.

5. The adder of claim 4 wherein said carry increment adder block is used with carry lookahead circuit for a least one of the less significant bit blocks.

6. The adder of claim 4 wherein all of said carry increment adders are used with a carry lookahead adder.

7. A multiple block adder comprising:
   a carry select adder block including most significant bit or sign bit; and
   a carry increment adder block.

8. A multiple block adder comprising:
   a carry select adder block for the most significant bits; and
   a carry increment adder block for less significant bits.

* * * * *